United States Patent
Lee

(10) Patent No.: US 6,550,332 B2
(45) Date of Patent: Apr. 22, 2003

(54) REAL-TIME NOISE SOURCE VISUALIZING SYSTEM USING ACOUSTIC MIRROR

(75) Inventor: Myung-Han Lee, Kunpo (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/991,205

(22) Filed: Nov. 20, 2001

(65) Prior Publication Data

US 2002/0059832 A1 May 23, 2002

(30) Foreign Application Priority Data

Nov. 22, 2000 (KR) ........................................ 2000-69435

(51) Int. Cl.[7] ................................................. G01M 9/04
(52) U.S. Cl. ............................. 73/583; 73/589; 73/599; 73/147
(58) Field of Search .......................... 73/583, 589, 599, 73/586, 587, 147; 381/160

(56) References Cited

U.S. PATENT DOCUMENTS

| | | | | |
|---|---|---|---|---|
| 4,149,034 A | * | 4/1979 | Frosch et al. ............... | 381/160 |
| 4,188,822 A | * | 2/1980 | Schoenherr et al. .......... | 73/147 |
| 4,644,794 A | * | 2/1987 | Vaicaitis ...................... | 73/583 |
| 5,288,955 A | * | 2/1994 | Staple et al. ................. | 181/158 |
| 5,568,404 A | * | 10/1996 | Strumolo ..................... | 702/140 |
| 2002/0149070 A1 | * | 10/2002 | Sheplak et al. ............. | 257/416 |

FOREIGN PATENT DOCUMENTS

| KR | 2002042140 | * | 6/2002 | ............ G01M/9/04 |
|---|---|---|---|---|

* cited by examiner

Primary Examiner—Daniel S. Larkin
Assistant Examiner—Rose M. Miller
(74) Attorney, Agent, or Firm—Christie, Parker & Hale, LLP

(57) ABSTRACT

Disclosed is a noise source visualizing system used in a wind tunnel test to measure generated sounds, the system comprising an acoustic mirror for converging sound waves of sounds generated on a surface of a vehicle during a wind tunnel test; a microphone measuring the converged sound waves; an image-photographing unit photographing locations on the vehicle at which the sounds are generated; a first display unit displaying the sounds measured by the microphone as colors that vary according to characteristics of the sounds; a movable traverse to which the acoustic mirror is connected for enabling the acoustic mirror to collect the sounds; a workstation for analyzing the converged sound waves measured by the microphone, the images photographed by the image-photographing unit, and the signals displayed through first display unit; and a second display unit overlapping then displaying image signals photographed by the image-photographing unit and the colors displayed on the first display unit.

3 Claims, 6 Drawing Sheets

(low voltage)  (high voltage)

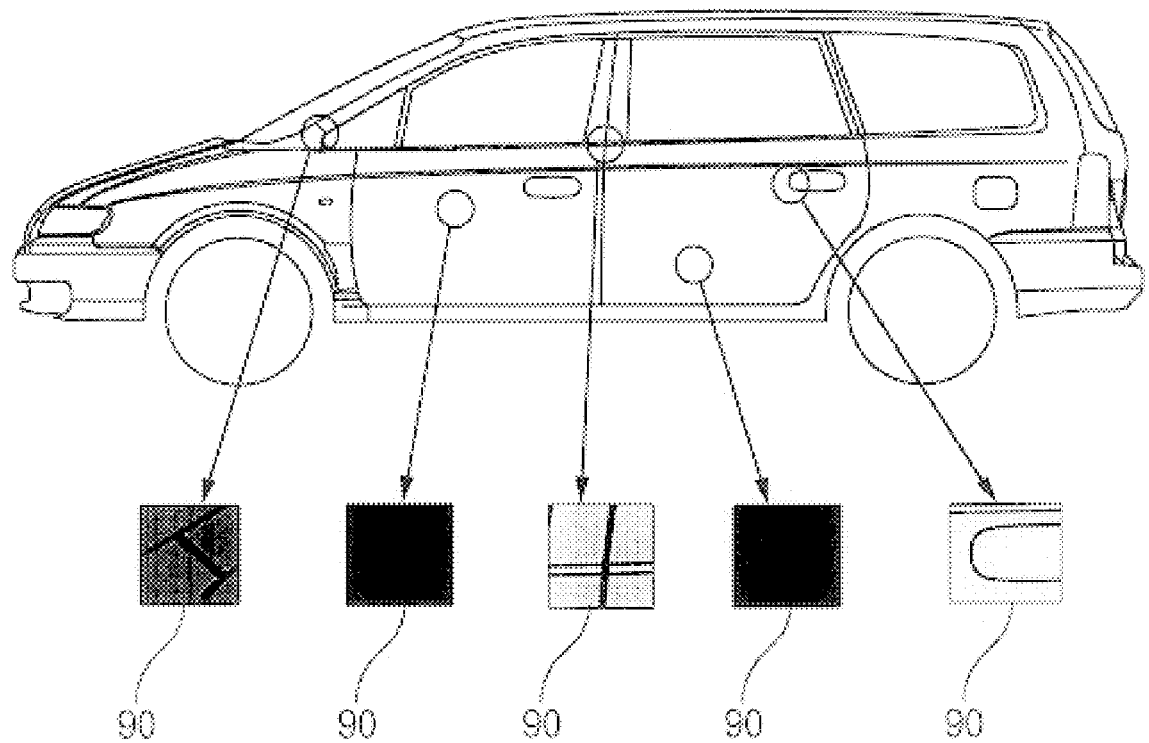

REAL-TIME NOISE SOURCE VISUALIZING SYSTEM USING ACOUSTIC MIRROR

CROSS-REFERENCE TO RELATED APPLICATION

This application claims priority of Korea patent Application No. 10-2000-0069435, filed on Nov. 22, 2000.

BACKGROUND OF THE INVENTION (a) Field of the Invention

The present invention relates to an acoustic mirror holographic system, and more particularly to a real-time noise source visualizing system using an acoustic mirror, in which sounds generated during a wind tunnel test may be measured and positions of where the sounds are generated may be visually perceived.

(b) Description of the Related Art

Vehicles often undergo wind tunnel tests to measure air resistance, lift, and the degree of shaking and noise generation caused by the flow of crossing winds. In such wind tunnel tests, the vehicle is placed on a balance system in a closed area, and large amounts of air are forced into the area so that the various measurements can be taken.

However, in the wind tunnel as described above, walls provided to enclose the vehicle influence the air stream, which is generated by the wind following the outer surface of the vehicle, thereby causing a blockage effect. Accordingly, the degree of air resistance, vehicle shaking caused by the air resistance, and areas at which sound is generated cannot be precisely measured.

Therefore, in order to precisely measure the positions where sound is generated as a result of air resistance, an acoustic mirror holographic system as shown in FIG. 1 is used. The acoustic mirror holographic system includes a sound source 10 generating sounds occurring as a result of air resistance, an acoustic mirror 11 concavely formed to reflect and converge the sounds generated by the sound source 10, a microphone 12 receiving the sounds reflected and converged by the acoustic mirror 11, and a recording unit (not shown) for recording electronic sound signals received from the microphone 12.

As-described above, the sound waves emitted from the sound source 10 are reflected and converged by the acoustic mirror 11. Accordingly, sound intensity converged by the acoustic mirror 11 is increased at the microphone 12 relative to a free field, with the microphone 12 being provided at a focal point of the converged sound. Therefore, the emission of sound of another area on a surface perpendicular to the acoustic mirror 11 can also be easily measured if the acoustic mirror 11 and the microphone 12 are moved by a traverse 13.

As opposed to a typical one-dimensional microphone 12 array, it is possible to determine the positions of sounds of all directions perpendicular to the axis of the acoustic mirror 11. However, with the above acoustic mirror holographic system, to determine the position of sounds of specific frequencies, a microphone is attached to the acoustic mirror, and pertinent data is recorded as the microphone and acoustic mirror are positioned by the traverse. Next, this recorded information is stored, and then a holographic process is performed using an instrument that analyzes the stored information. All these processes must be performed to find sounds of specific frequencies.

Therefore, much hardware is needed, and the time required for data analysis is substantial such that real-time measurements are not possible.

SUMMARY OF THE INVENTION

The present invention has been made in an effort to solve the above problems.

It is an object of the present invention to provide a real-time noise source visualizing system using an acoustic mirror, in which sounds generated during a wind tunnel test may be measured and positions of where the sounds are generated may be visually perceived such that methods to correct the factors leading to the generation of sounds may be quickly devised.

To achieve the above object, the present invention provides a noise source visualizing system used in a wind tunnel test to measure generated sounds, the system comprising an acoustic mirror for converging sound waves of sounds generated on a surface of a vehicle during a wind tunnel test; a microphone mounted at a position where the sound waves are converged by the acoustic mirror, the microphone measuring the converged sound waves; an image-photographing unit mounted to one side of the microphone and which photographs locations on the vehicle at which the sounds are generated; a first display unit mounted to a distal end of the image-photographing unit, and which performs display of the sounds measured by the microphone as colors that vary according to characteristics of the sounds; a traverse to which the acoustic mirror is connected and which is mounted near a side of the vehicle, and which is able to move up and down and along a length of the vehicle to positions for enabling the acoustic mirror to collect the sounds; a workstation for analyzing the converged sound waves measured by the microphone, the images photographed by the image-photographing unit, and the signals displayed through the first display unit; and a second display unit overlapping then displaying image signals photographed by the image-photographing unit and the colors displayed on the first display unit.

According to a feature of the present invention, the system further comprises a voltage amplifier for amplifying a voltage measured by the microphone to enable the voltage to be separated into colors at the first display unit.

According to another feature of the present invention, the first display unit the colors on a screen of the first display unit vary according to a voltage measured and amplified in real-time, whereby if the voltage is low, the first display unit displays a bluish tint, and if the voltage is high, the first display unit 60 displays a reddish tint such that if a blue color is displayed, the sound level is interpreted to be low, and if a red color is displayed, it is determined that the sound level is high.

BRIEF DESCRIPTION OF THE DRAWINGS

The accompanying drawings, which are incorporated in and constitute a part of the specification, illustrate an embodiment of the invention, and, together with the description, serve to explain the principles of the invention.

FIG. 6 is a view showing overlapping of colors, which vary as a voltage is amplified according to the intensity of sounds, on positions of a vehicle where the sounds originate.

DETAILED DESCRIPTION OF THE PREFERRED EMBODIMENTS

Preferred embodiments of the present invention will now be described in detail with reference to the accompanying drawings.

Figure 1:
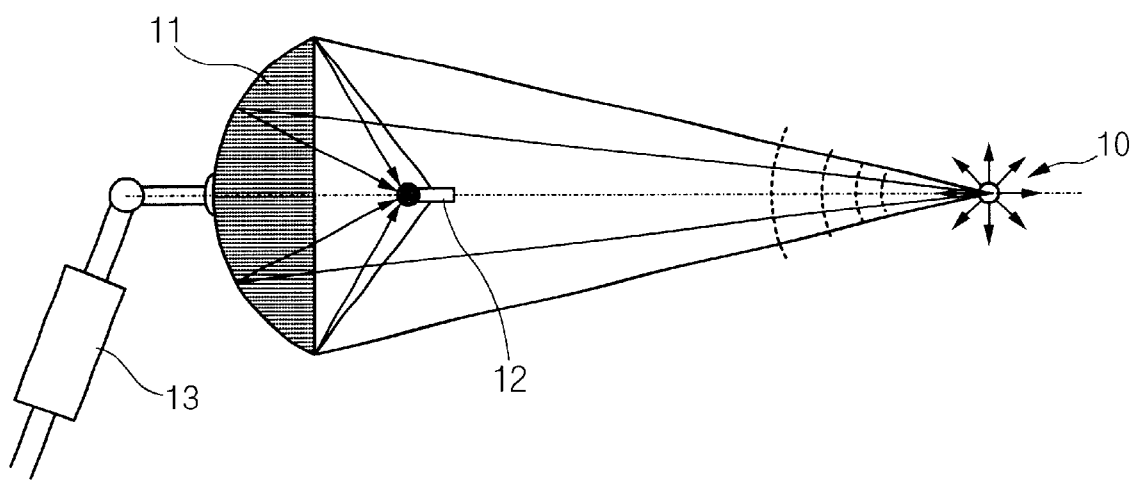
FIG. 1 is a schematic view of an acoustic mirror holographic system.
Figure 2:
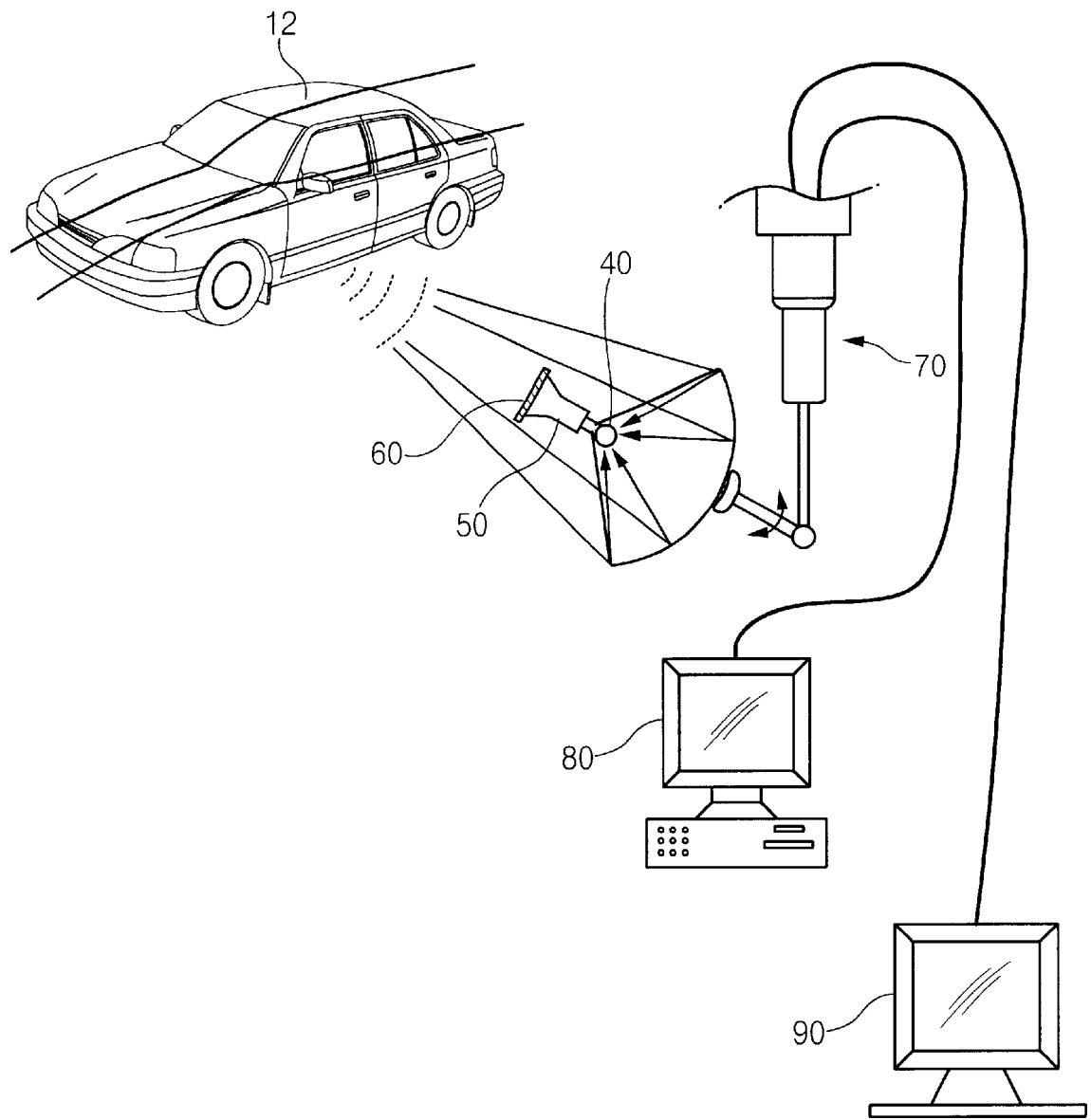
FIG. 2 is a schematic view of a real-time noise source visualizing system that uses an acoustic mirror, and elements related to the system according to a preferred embodiment of the present invention.
Figure 3:
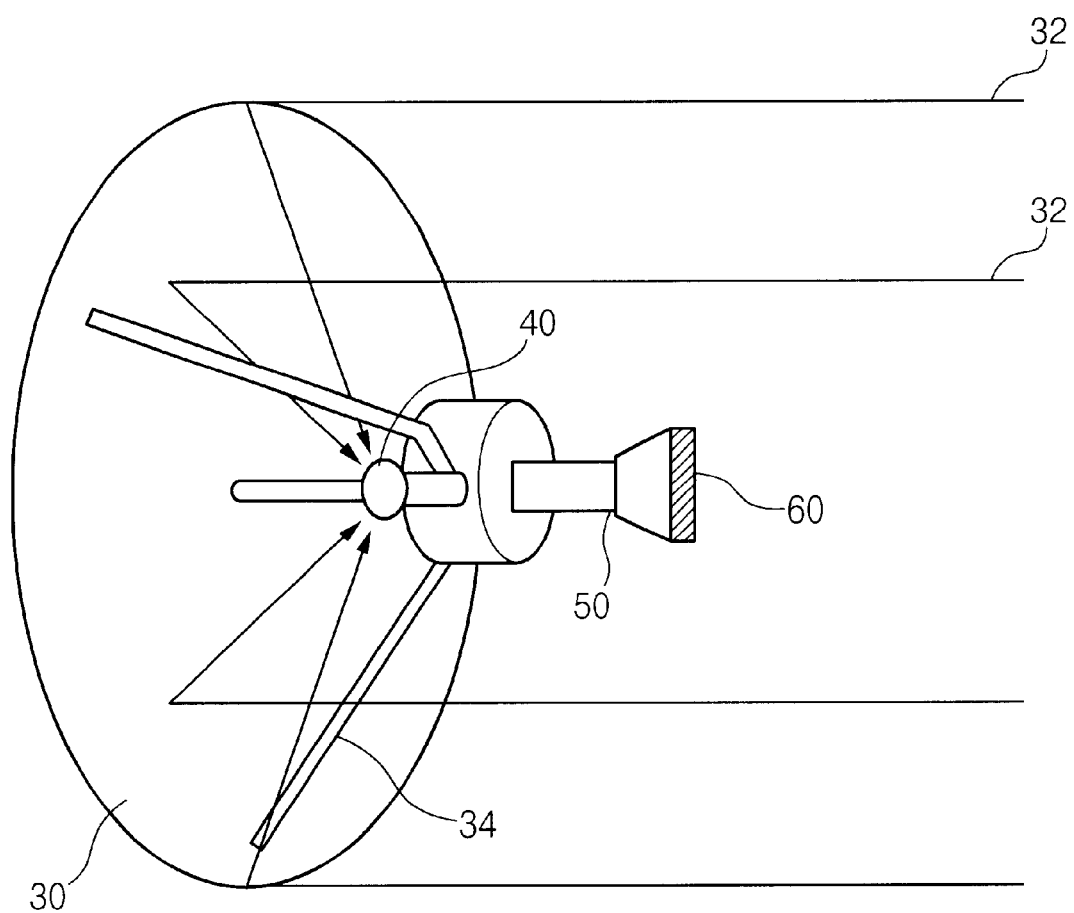
FIG. 3 is a perspective view of elements attached to an acoustic mirror of FIG. 2.
Figure 4:
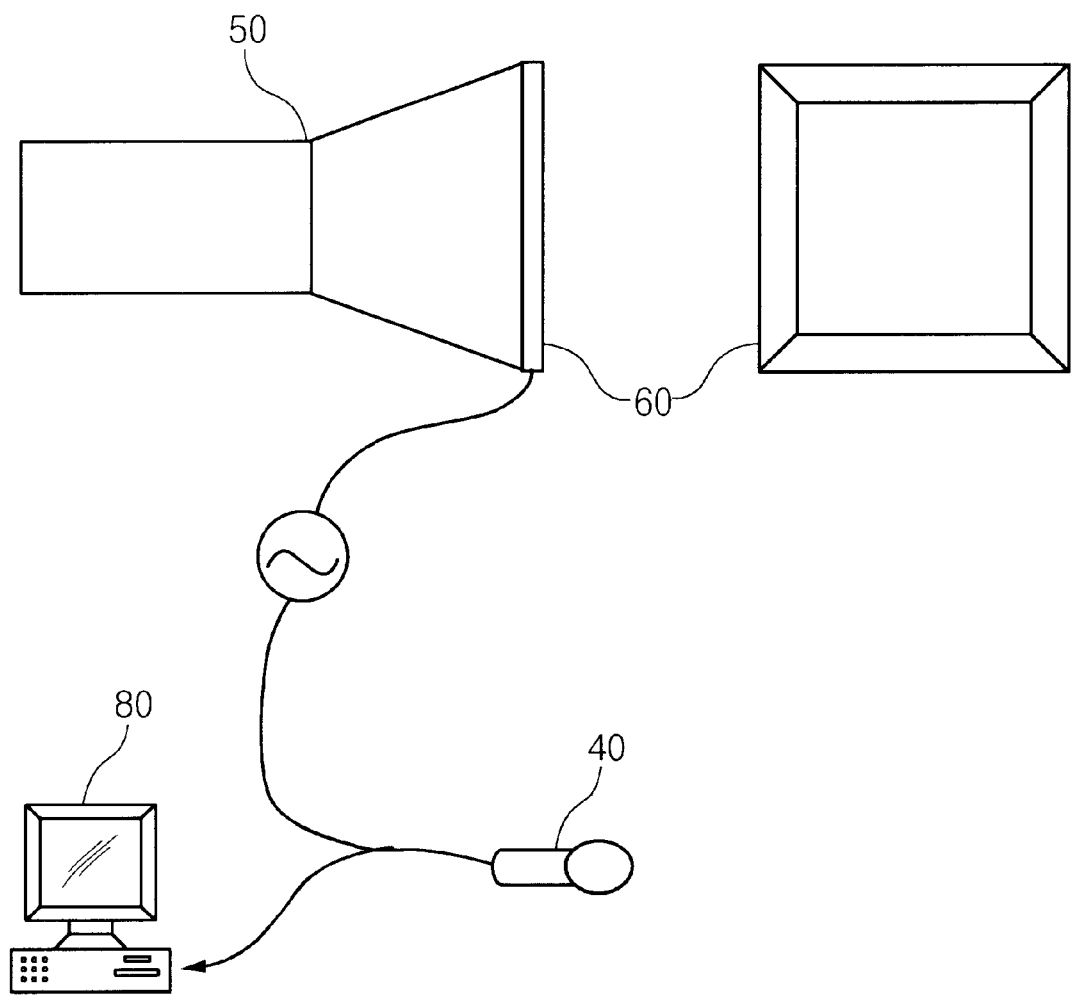
FIG. 4 a detail view of a first display unit and a microphone of FIG. 2.

FIG. 2 shows a schematic view of a real-time noise source visualizing system that uses an acoustic mirror, and elements related to the system according to a preferred embodiment of the present invention, and FIG. 3 is a perspective view of elements attached to an acoustic mirror of FIG. 2. Reference numeral 30 indicates an acoustic mirror, reference numeral 32 designates sound waves emitted from a sound source, and reference numeral 34 indicates a support for supporting a microphone 40 and an image-photographing unit 50. Reference is also made to FIG. 4, which shows a detail view of a first display unit 60 and the microphone 40.

The noise source visualizing system of the present invention is capable of measuring sounds generated by wind on a vehicle 20, and, at the same time, of displaying the source of sounds, even without an audio system.

As shown in FIG. 2, the real-time noise source visualizing system using the acoustic mirror 30 includes the acoustic mirror 30, the microphone 40, the image-photographing unit 50, the first display unit 60, a traverse 70, a workstation 80, and a second display unit 90. The acoustic mirror 30 converges the sound waves 32 of sounds generated as a result of winds acting on the vehicle 20 during a wind tunnel test.

The microphone 40 is mounted at a location where the sound waves 32 are converged by the acoustic mirror 30, and acts to measure the converged sound waves 32. A voltage measured by the microphone 40 generally does not exceed 10 mV. Accordingly, a voltage amplifier 62 as shown in FIG. 4 is needed to enable the voltage measured by the microphone 40 to be separated into colors at the first display unit 60.

The image-photographing unit 50 is a CCD camera for photographing areas on the vehicle 20 at which sound is generated. The image-photographing unit 50 is attached to one side of the microphone 40.

The first display unit 60 is mounted to a distal end of the image-photographing unit 50 (i.e., from its attachment to the microphone 40 or the end closest to the vehicle). The first display unit 60 acts to convert the sounds measured by the microphone 40 into color representations. The first display unit 60 is realized through a TFT-LCD (thin film transistor liquid crystal display). TFT-LCDs are used in various applications to display characters, numbers and diagrams, and are also used as the screen for televisions.

A liquid crystal cell of the TFT-LCD includes a pair of glass substrates that are provided at a predetermined distance and sealed, and liquid crystals injected between the substrates. Electrodes are provided on inner faces of the substrates for-forming images, and the electrodes are electrically connected to external terminals. Although the liquid crystals appear at first to be a fluid, optically they display dielectric properties as with a solid, and are an organic compound referred to as thermotropic liquid crystals that convert to liquid crystals in a predetermined temperature range.

There are reflective and transmissive types of TFT-LCDs. In the reflective TFT-LCD, display is realized by reflecting light, which is irradiated from a front surface of an LCD panel to a reflective panel mounted to a rear of the panel. In the transmissive TFT-LCD, peripheral light or fluorescent light is irradiated from a rear surface of the LCD panel to realize images. The present invention uses the transmissive type TFT-LCD since the image of the vehicle 20 must be displayed in the background together with the sound image through the TFT-LCD mounted to the front of the CCD camera lens.

The traverse 70 positions the acoustic mirror 30 (and attached elements) to optimally intercept the sound waves 32 created during the wind tunnel test. The traverse 70 can undergo various movements to perform this function.

The workstation 80 acts as a controller to analyze the converged sound waves 32 measured by the microphone 40, the images photographed by the image-photographing unit 50, and the signals displayed through the first display unit 60. The workstation 80 then performs control for display through the second display unit 90 of an intensity of the sounds and of the overlapping of the sounds on the positions where they are generated. The second display unit 90 overlaps the image signals photographed by the image-photographing unit 50 and the colors displayed on the first display unit 60 to display colors and the positions of sounds.

Figure 5:
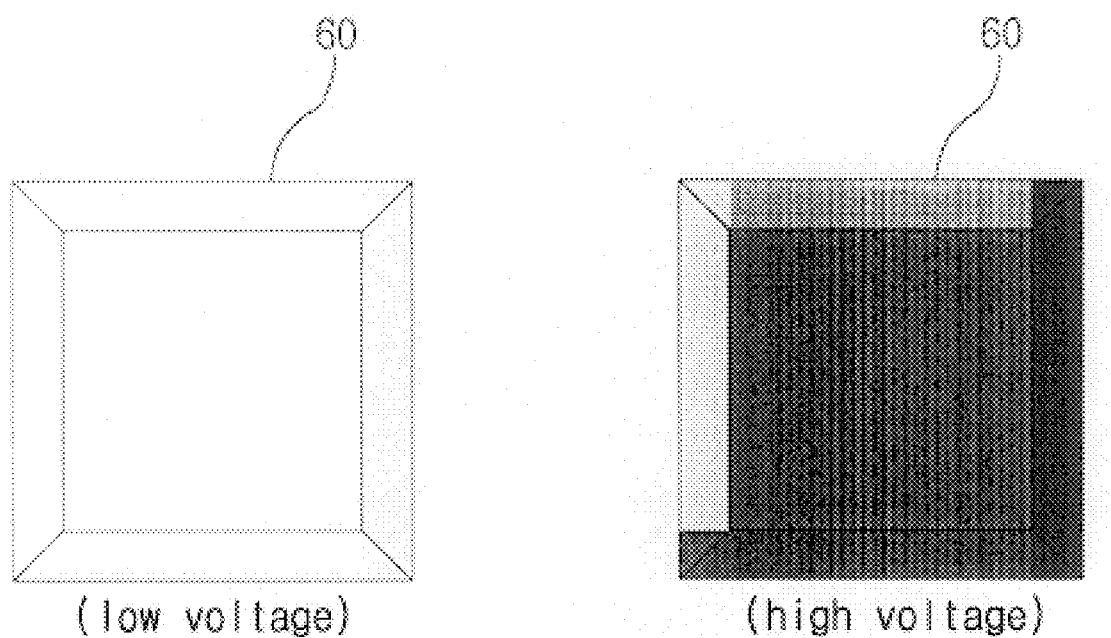
FIG. 5 is a view showing the variation of colors of a screen on a first display unit as a voltage is amplified according to the intensity of sounds.

FIG. 5 is a view showing the variation of colors on a screen of the first display unit 60 as a voltage is amplified, according to the intensity of sounds. FIG. 6 is a view showing overlapping of colors, which vary as a voltage is amplified according to the intensity of sounds, on positions of a vehicle where the sounds originate.

Also with reference to these drawings, a measurement voltage supplied by the microphone 40 is amplified by the voltage amplifier 62 and applied to the first display unit 60. Accordingly, colors in the screen of the first display unit 60 vary according to a voltage measured and amplified in real-time. In the case where the voltage is low, the first display unit 60 displays a bluish tint as shown in the left image of FIG. 5, and if the voltage is high, the first display unit 60 displays a reddish tint as shown in the right image of FIG. 5. Therefore, if a blue color is displayed, the sound level is interpreted to be low, and if a red color is displayed, it is determined that the sound level is high.

An operation of the real-time noise source visualizing system using an acoustic mirror of the present invention will now be described with reference to the drawings.

First, the vehicle 20 is placed at a predetermined position in a wind tunnel. Next, large amounts of air are forced into the wind tunnel to measure air resistance, lift, and the effects of wind on the surface of the vehicle 20 as a result of crossing winds.

In the above state, the acoustic mirror 30 mounted to the traverse 70 is moved up and down and from front to rear of the vehicle 20 to find sounds generated on the surface of the vehicle 20, and the sounds are measured by the microphone 40 mounted to the acoustic mirror 30. The sounds measured by the microphone 40 are transmitted to the workstation 80 (LMS system), which can perform recording and analysis, and, at the same time, they pass through the voltage amplifier 62 to be supplied to the first display unit 60.

The image-photographing unit 50 mounted to the acoustic mirror 30 monitors measurements and measurement areas at the microphone 40, and enables display on a screen. At this time, by the transmissive first display unit 60, which is mounted on the image-photographing unit 50, areas where the level of sound is high are overlapped on particular areas of the vehicle 20 in red, and areas where the level of sound is low are overlapped on particular areas of the vehicle 20 in blue.

Accordingly, with the real-time noise source visualizing system of the present invention, the acoustic mirror 30 is moved by the traverse 70, and the colors on the first display unit 60 are varied and displayed according to the intensity of the collected sounds, thereby enabling easy determination of the intensity of sounds generated on a vehicle surface. The workstation 80 (LMS system) analyzes data after all measurements, and displays both the intensity of the sounds and the positions from where the sounds originate on the second display unit 90 as shown in FIG. 6, by performing holographic processing.

In the real-time noise source visualizing system of the present invention, the positions from where sounds originate and the intensity of the sounds can be determined in real-time, unlike the method in which characteristics of sounds are determined after the sounds are measured then analyzed. Also, as a result of the method used with the present invention in which colors representing the intensity of sounds are overlapped onto specific areas of a vehicle at which the sounds are generated, the intensity and corresponding position of sounds generated on a vehicle during a wind tunnel test may be easily and quickly determined.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A noise source visualizing system used in a wind tunnel test to measure generated sounds, the system comprising:

an acoustic mirror for converging sound waves of sounds generated on a surface of a vehicle during a wind tunnel test;

a microphone mounted at a position where the sound waves are converged by the acoustic mirror, the microphone measuring the converged sound waves;

an image-photographing unit mounted to one side of the microphone and which photographs locations on the vehicle at which the sounds are generated;

a first display unit mounted to a distal end of the image-photographing unit, and which performs display of the sounds measured by the microphone as colors that vary according to characteristics of the sounds;

a traverse to which the acoustic mirror is connected and which is mounted near a side of the vehicle, and which is able to move up and down and along a length of the vehicle to positions for enabling the acoustic mirror to collect the sounds;

a workstation for analyzing the converged sound waves measured by the microphone, the images photographed by the image-photographing unit, and the signals displayed through the first display unit; and a second display unit overlapping then displaying image signals photographed by the image-photographing unit and the colors displayed on the first display unit.

2. The system of claim 1 further comprising a voltage amplifier for amplifying a voltage measured by the microphone to enable the voltage to be separated into colors at the first display unit.

3. The system of claim 2 wherein the colors in a screen of the first display unit vary according to a voltage measured and amplified in real-time, and in the case where the voltage is low, the first display unit displays a bluish tint, and if the voltage is high, the first display unit 60 displays a reddish tint such that if a blue color is displayed, the sound level is interpreted to be low, and when a red color is displayed, it is determined that the sound level is high.

* * * * *